United States Patent
Löffler et al.

(10) Patent No.: US 7,172,835 B2
(45) Date of Patent: Feb. 6, 2007

(54) ALKALINE RECHARGEABLE BATTERY WITH MEDIUM-LENGTH CARBON FIBERS

(75) Inventors: Jens Löffler, Hannover (DE); Michael Stober, Springe (DE)

(73) Assignee: Varta Automotive Systems GmbH, Hannover (DE)

( * ) Notice: Subject to any disclaimer, the term of this patent is extended or adjusted under 35 U.S.C. 154(b) by 581 days.

(21) Appl. No.: 10/429,920

(22) Filed: May 6, 2003

(65) Prior Publication Data

US 2003/0232247 A1 Dec. 18, 2003

(30) Foreign Application Priority Data

May 7, 2002 (DE) ................................ 102 20 486

(51) Int. Cl.
  *H01M 4/32* (2006.01)
  *H01M 4/62* (2006.01)
(52) U.S. Cl. ...................................... 429/223; 429/232
(58) Field of Classification Search .................... None
  See application file for complete search history.

(56) References Cited

U.S. PATENT DOCUMENTS

| | | |
|---|---|---|
| 4,595,463 A | 6/1986 | Lee |
| 5,500,309 A | 3/1996 | Lichtenberg et al. |
| 5,738,953 A | 4/1998 | Lichtenberg et al. |
| 5,738,958 A | 4/1998 | Lichtenberg |
| 5,858,061 A | 1/1999 | Kleinsorgen et al. |
| 5,919,588 A | 7/1999 | Jose et al. |
| 6,210,833 B1 * | 4/2001 | Bernard et al. ............. 429/223 |
| 6,881,519 B2 | 4/2005 | Bauerlein |
| 2002/0039682 A1 | 4/2002 | Bauerlein |
| 2002/0177038 A1 | 11/2002 | Chen et al. |
| 2003/0059670 A1 | 3/2003 | Bechtold et al. |
| 2005/0221179 A1 | 10/2005 | Baeuerlein et al. |

FOREIGN PATENT DOCUMENTS

| | | |
|---|---|---|
| EP | 0 634 804 | 1/1995 |
| EP | 0 658 948 | 6/1995 |
| EP | 0 935 301 | 8/1999 |
| JP | 59-151758 | 8/1984 |
| JP | 10-223228 | * 8/1998 |

* cited by examiner

*Primary Examiner*—Jonathan Crepeau
(74) *Attorney, Agent, or Firm*—Foley & Lardner LLP

(57) ABSTRACT

The invention relates to an alkaline rechargeable battery for storing electrical energy having a positive electrode which, as the substrate material, has a nickel foam strip, a nickel strip or nickel-plated perforated or unperforated steel strip and a pasty active material, which is composed mainly of nickel hydroxide and contains particles of cobalt hydroxide, cobalt monoxide as well as a plastic binding agent, a negative electrode and a separator which is arranged between the electrodes, in a closed housing. As the conductive agent, the positive active material contains 9 to 20% by weight of a graphite mixture, which is composed of more that 70% of fibrous graphite with a fiber length of 10 to 35 μm and a fiber diameter of 3 to 8 μm, and, in addition to this, spherical graphite with a particle diameter $d_{50}$ of 3 to 8 μm.

14 Claims, 2 Drawing Sheets

ALKALINE RECHARGEABLE BATTERY WITH MEDIUM-LENGTH CARBON FIBERS

BACKGROUND OF THE INVENTION

Field of the Invention

The invention relates to an alkaline rechargeable battery for storing electrical energy, having a closed housing, a positive electrode, a negative electrode and a separator which is arranged between the electrodes, with the positive electrode having as a substrate material a nickel foam strip, a nickel strip or nickel-plated perforated or unperforated steel strip and a pasty active material, which is composed mainly of nickel hydroxide, and contains particles of cobalt hydroxide or cobalt monoxide as well as a binding agent.

The document JP 59151758 A describes the production of a nickel electrode in the form of paste. The active mass is mixed from 1 kg of nickel hydroxide, which has been passed through a sieve with a grid width of 200, 50 g of nickel carbonyl powder, 80 g of graphite fibers with a fiber diameter of 0.1 mm and a fiber length of 3 to 5 mm, 20 g of acryronitrile vinylchloride fibers and approximately 30 g of cobalt carbonyl powder, to which 1 kg of 3% by weight aqueous carboxymethyl cellulose solution is added, in order to produce paste. The substrate material comprises a 0.1 mm thick steel strip material, which is nickel-plated and is provided with holes with a diameter of 2 mm.

The document EP 634 804 A1 describes a positive nickel electrode for an alkaline storage battery, which is composed of an active material mixture whose main components are nickel hydroxide and conductive additives. The active material mixture contains at least one of the components cobalt, cobalt hydroxide and cobalt oxide and graphite powder with a grating constant of the (002) plane $d_{002}$ of 3.35 to 3.45 Angstrom.

The document EP 0 658 948 B1 describes the positive electrode of a nickel metal-hydride rechargeable battery, which is formed from a mass mixture of nickel hydroxide and an oxidation-resistant graphite. The stable graphite is distinguished by a high crystallinity level (crystal size at least 180 nm) and has a low ash content <0.5%. Conventional nickel metal-hydride rechargeable batteries, in which cobalt compounds are involved to a considerable extent in the formation of a conductive structure, suffer from massive loss of capacity during high-temperature storage tests, as a result of reductive decomposition of the conductive structure. This effect is avoided by the described mass mixture.

The document EP 0 935 301 discloses a nickel electrode, in the form of paste, for a storage cell with an alkaline electrolyte, with an electrode comprising an electrical contact, and with an active mass based on nickel hydroxide in the form of powder with a graphite-based conductive additive. The conductive additive is produced from graphite particles which are resistant to electrochemical oxidation and have specific characteristics. The graphite may be in spherical form with a diameter of less than or equal to 500 nm, and in fibrous form with a fiber diameter of 5 to 15 µm and a fiber length of greater than or equal to 125 µm.

The invention is based on the object of specifying an alkaline rechargeable battery having a positive electrode which achieves a high level of cycle stability by means of improved mechanical elasticity and internal conductivity of the positive active material.

According to the invention, the object is achieved by an alkaline rechargeable battery as is defined in claim 1. Further advantageous refinements are characterized in the dependent claims.

An alkaline rechargeable battery with positive wet-coated electrode with improved cycle strength can be produced if 9 to 20% by weight of a graphite mixture is added as a conductive agent to the positive active material, the graphite mixture being composed of more than 70% of fibrous graphite with a fiber length of 10 to 35 µm and with a fiber diameter of 3 to 8 µm. The rest of the conductive agent—that is to say probably 15 to <30% by weight of the total conductive agent mass—may be composed of essentially spherical graphite with a particle diameter $d_{50}$ of 3 to 8 µm. Good conductivity is also achieved by substituting nickel powder with a particle size of 3 to 8 µm for the spherical graphite.

An additional conductive agent within the electrode material for the positive electrode of a rechargeable battery, which is used to increase the conductivity, is already known from WO 00/10212. The conductive agent is at least partially embedded in the active material It may be composed of metal, nickel, copper, their alloys, oxides, nitrides, carbides, silicides, borides, carbon or graphite, which may also be elongated, and with branches, in fibrous form. No relationship between the fiber length, fiber strength, conductivity and mechanical strength is yet recognized there.

Even before the invention, short graphite fibers were used as an additive to the conductive agent of the active electrode material. Such short graphite fibers, with a length of up to about 5 µm, as are known by way of example from JP 5915175 A, make a significant contribution to the total conductivity of the active material, but do not make any significant contribution to the mechanical robustness.

Nickel-coated graphite fibers with a length of up to 2 cm in a molding composed of a thermoplastic polymer resin which can be injection-molded are used in WO 00/44005, in which case the molding is intended to have a low volume resistance of less than $10^{-2}$ ohm/cm. It is impossible to draw any conclusions relating to the characteristics of a pasty nickel-based positive electrode material for rechargeable batteries based on the thermoplastic material that is provided for fuel cells.

For the purposes of the invention, it has now been found that the contribution to the conductivity decreases with relatively long fibers, although these considerably increase the mechanical load capacity. The increase in the mechanical load capacity is achieved, based on current knowledge, by improving the mechanical elasticity of the active material on the substrate, which leads to surprisingly good stability of the rechargeable battery over a large number of cycles. The load capacity also increases to an unexpected extent with the material according to the invention when used at high current levels/current densities.

Improved adhesion of the positive active mass to the substrate material is achieved if a layer of nickel grains with a grain size of less than or equal to 20 µm is sintered onto the nickel-plated steel sheet, with the mass per unit area of a layer of sintered-on nickel grains being 0.2 to 0.7 g/dm².

The electrical connection of the pasted-on electrode mass is even further improved if the substrate material is provided with a layer of cobalt oxide or cobalt(II)oxide, which is converted to cobalt(III)oxide during the formatted process, and whose mass per unit area is up to 0.2 g/dm².

The further components of the new positive electrode mass are preferably: 65 to 85% by weight of nickel hydroxide with a particle diameter $d_{50}$ of 7 to 12 µm, up to 10% by weight of cobalt hydroxide with a particle diameter $d_{50}$ of 1 to 5 μm, up to 10% by weight of cobalt oxide with a particle diameter $d_{50}$ of up to 1 μm, and up to 2% by weight of conductive carbon black.

In one advantageous refinement, 2 to 5% by weight of a binding agent is added to the mixture, preferably in the form of fibrous tetrafluoroethylene or polyethylene powder with a fiber length of 50 to 100 μm, or an aqueous dispersion which contains from 50 to 80% of binding agent powder with a particle size of 100 to 300 nm.

The following examples, which are intended to be used only for illustrative purposes without any restriction to the invention being perceived in them, are intended to assist understanding to describe the advantageous of the invention.

EXAMPLES

Example 1

(Comparative Example)

Known methods for wet pasting preferably use pure nickel powder as the conductive material. The following mass mixture is used for reference measurements:

| | |
|---|---|
| Ni (OH)$_2$: | 63% by weight |
| Ni-powder: | 20% by weight |
| Co-oxide: | 10% by weight |
| Graphite: | 4% by weight |
| Conductive carbon black: | 1% by weight |
| Plastic binding agent: | 2% by weight |

The paste produced in this way was applied to a nickel-plated perforated metal sheet, was dried, was rolled and was subjected to life tests.

Example 2

A rechargeable battery according to the invention was produced with a wet-pasted electrode, for which the following mass was used:

| | |
|---|---|
| Ni (OH)$_2$: | 71% by weight |
| Co (OH)$_2$: | 10% by weight |
| Graphite: | 14% by weight |
| Conductive carbon black: | 1% by weight |
| Plastic binding agent: | 4% by weight |

The graphite in this example is composed of 20% of spherical graphite with a particle diameter of 3 to 8 μm and of 80% of fibrous graphite with a fiber diameter of 3 to 8 μm and with a fiber length of 15 to 35 μm, with the mixture comprising fibers of different length and different thickness in this stated length and diameter range. The paste produced in this way is applied to a nickel-plated perforated metal sheet, is dried and is subjected to life tests.

The following text refers to the attached figures, in which.

Figure 1:
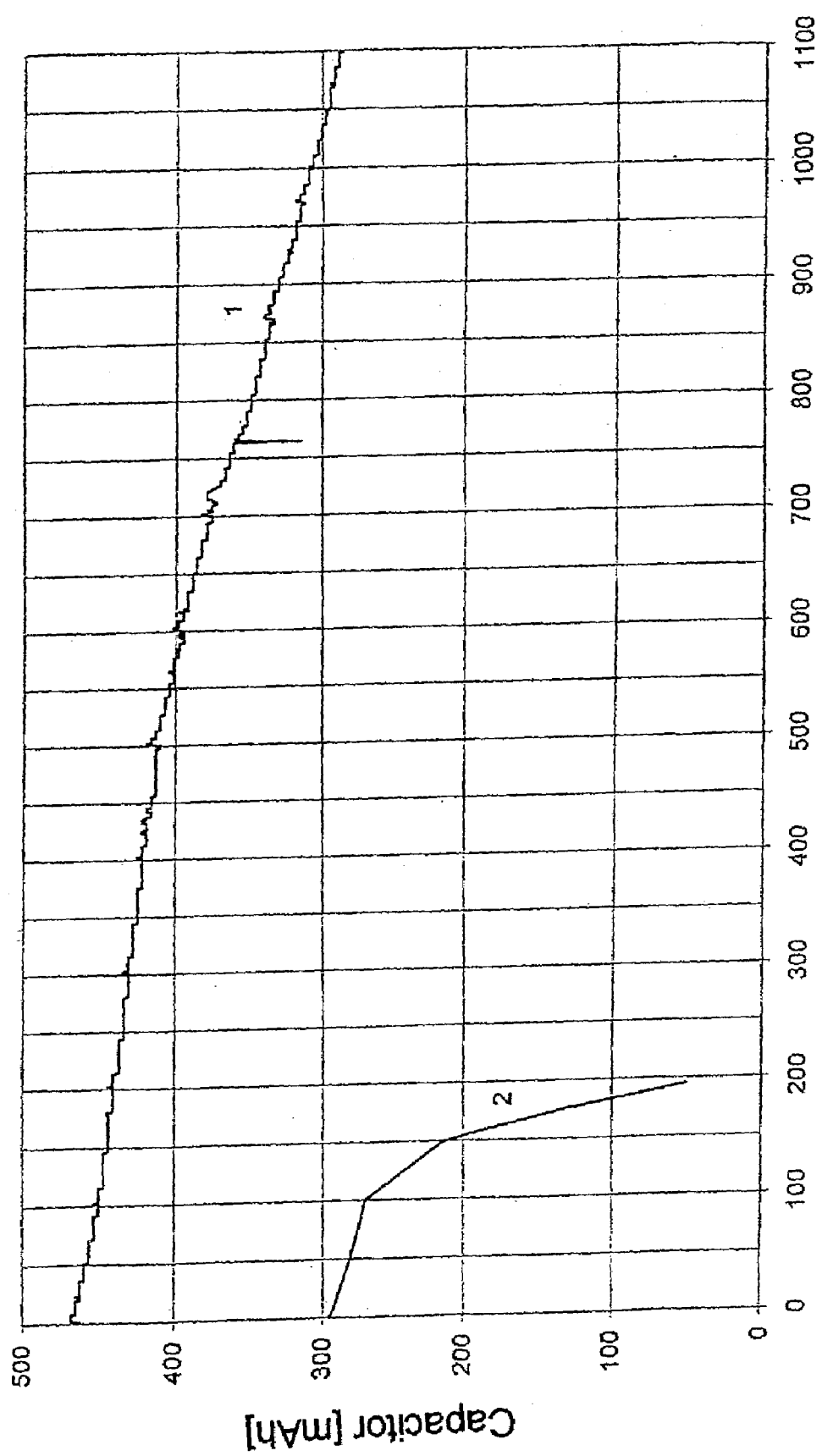
FIG. 1 shows a graphical illustration of the results of a life test.

As shown in FIG. 1, alkaline rechargeable battery with a wet-pasted positive electrode corresponding to Example 1 (capacity profile corresponding to the curve 2) has a comparatively low capacity, which falls to less than 70% of the initial capacity after only 150 charging cycles. The initial capacity of the alkaline rechargeable batteries (capacity profile corresponding to curve 1) with a positive electrode produced in accordance with Example 2 is approximately 50% greater. The rechargeable batteries are surprisingly stable. Their capacity falls to about 70% of the initial capacity after approximately 850 charging cycles.

Figure 2:
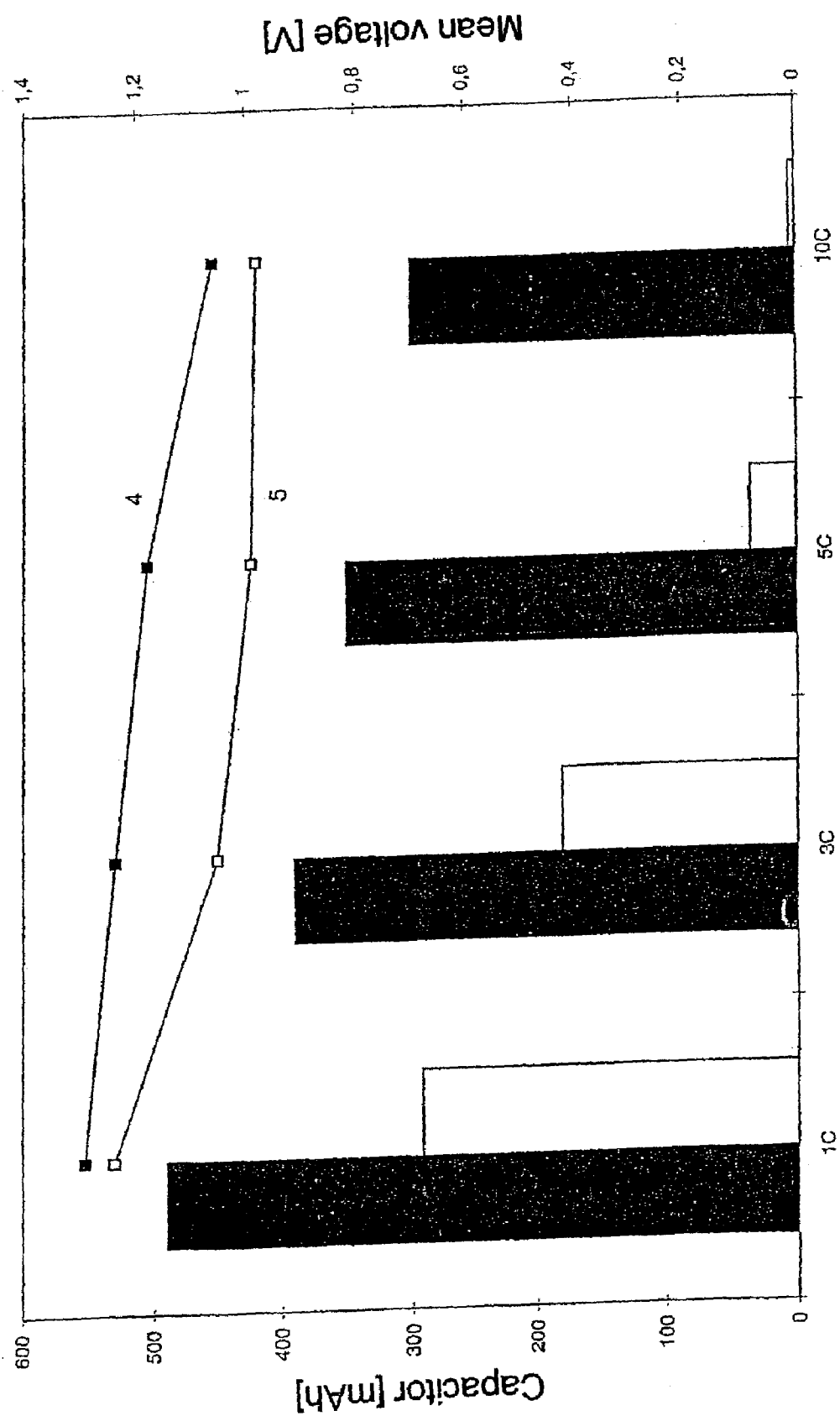
FIG. 2 shows an illustration of the results of load tests.

The graph in FIG. 2 shows an illustration of the results of tests to determine the capacity of rechargeable batteries when loaded at 1 (1C), 3 (3C), 5 (5C) and 10 (10C) times the rated current. In addition, the graph shows the mean voltage of the two embodiments of the rechargeable batteries for each of the loads. The rechargeable batteries according to the invention, black bars, are considerably superior to the rechargeable batteries used for comparison, white bars. With a heavy current load, the capacity of the rechargeable batteries according to the invention falls by about 37.5%, or that of the rechargeable batteries used for comparison falls by more than 98%. In this case, the mean voltage of the new rechargeable batteries (curve 4) falls less severely than that of the rechargeable batteries with a conventional wet-pasted, positive electrode (curve 5).

What we claim is:

1. An alkaline rechargeable battery for storing electrical energy, having a closed housing, a positive electrode, a negative electrode and a separator which is arranged between the electrodes, with the positive electrode having as a substrate material a nickel foam strip, a nickel strip or nickel-plated perforated or unperforated steel strip and a pasty active material, which is composed mainly of nickel hydroxide, and contains particles of cobalt hydroxide or cobalt monoxide as well as a binding agent, wherein the active material of the positive electrode contains 9 to 20% by weight of a graphite mixture as the conductive agent, more than 70% of which is composed of fibrous graphite with a fiber length of 10 to 35 μm and with a fiber diameter of 3 to 8 μm.

2. The alkaline rechargeable battery as claimed in claim 1, wherein the graphite mixture of the active material contains essentially spherical graphite, with a particle diameter $d_{50}$ of 3 to 8 μm, in addition to the fibrous graphite.

3. The alkaline rechargeable battery as claimed in claim 1, wherein a layer of nickel grains with a grain size of less than or equal to 20 μm is sintered onto the substrate material.

4. The alkaline rechargeable battery as claimed in claim 3, wherein the mass per unit area of the layer of sintered-on nickel grains is 0.2 to 0.7 g/dm$^2$.

5. The alkaline rechargeable battery as claimed in one of claim 1, wherein the substrate material is provided with a layer of cobalt(III)oxide or cobalt(II)oxide, which is converted to cobalt(III)oxide during the formatting process.

6. The alkaline rechargeable battery as claimed in claim 5, wherein the mass per unit area of the layer of cobalt oxide or cobalt(II)oxide is up to 0.2 g/dm$^2$.

7. The alkaline rechargeable battery as claimed in claim 1, wherein the positive active material is composed of 65 to 85% by weight of nickel hydroxide with a particle diameter $d_{50}$ of 7 to 12 μm.

8. The alkaline rechargeable battery as claimed in claim 1, wherein the positive active material is composed of up to 10% by weight of cobalt hydroxide with a particle diameter $d_{50}$ of 1 to 5 μm.

9. The alkaline rechargeable battery as claimed in claim 1, wherein the positive active material is composed of up to 10% by weight of cobalt hydroxide with a particle diameter $d_{50}$ of up to 1 μm.

10. The alkaline rechargeable battery as claimed in claim 1, wherein the positive active material is composed of up to 30% by weight of nickel powder with a particle diameter $d_{50}$ of 3 to 8 μm.

11. The alkaline rechargeable battery as claimed in claim 1, wherein the positive active material contains up to 2% by weight of conductive carbon black.

12. The alkaline rechargeable battery as claimed in claim 1, wherein the positive active material contains 3 to 5% by weight of a binding agent composed of plastic.

13. The alkaline rechargeable battery as claimed in claim 1, wherein the positive active material contains 3 to 5% by weight of a binding agent, which is added in the form of an aqueous polyethylene or polytetrafluoroethylene dispersion which contains from 50 to 80% of polyethylene or polytetrafluoroethylene powder with a particle size of 100 to 300 nm.

14. The alkaline rechargeable battery as claimed in claim 12, wherein the plastic is a fibrous polytetrafluoroethylene or polyethylene powder with a fiber length of 50 to 100 μm.

* * * * *